T. A. EDISON.
FRICTION SPEED GOVERNOR.
APPLICATION FILED DEC. 2, 1913.
1,290,138.
Patented Jan. 7, 1919.
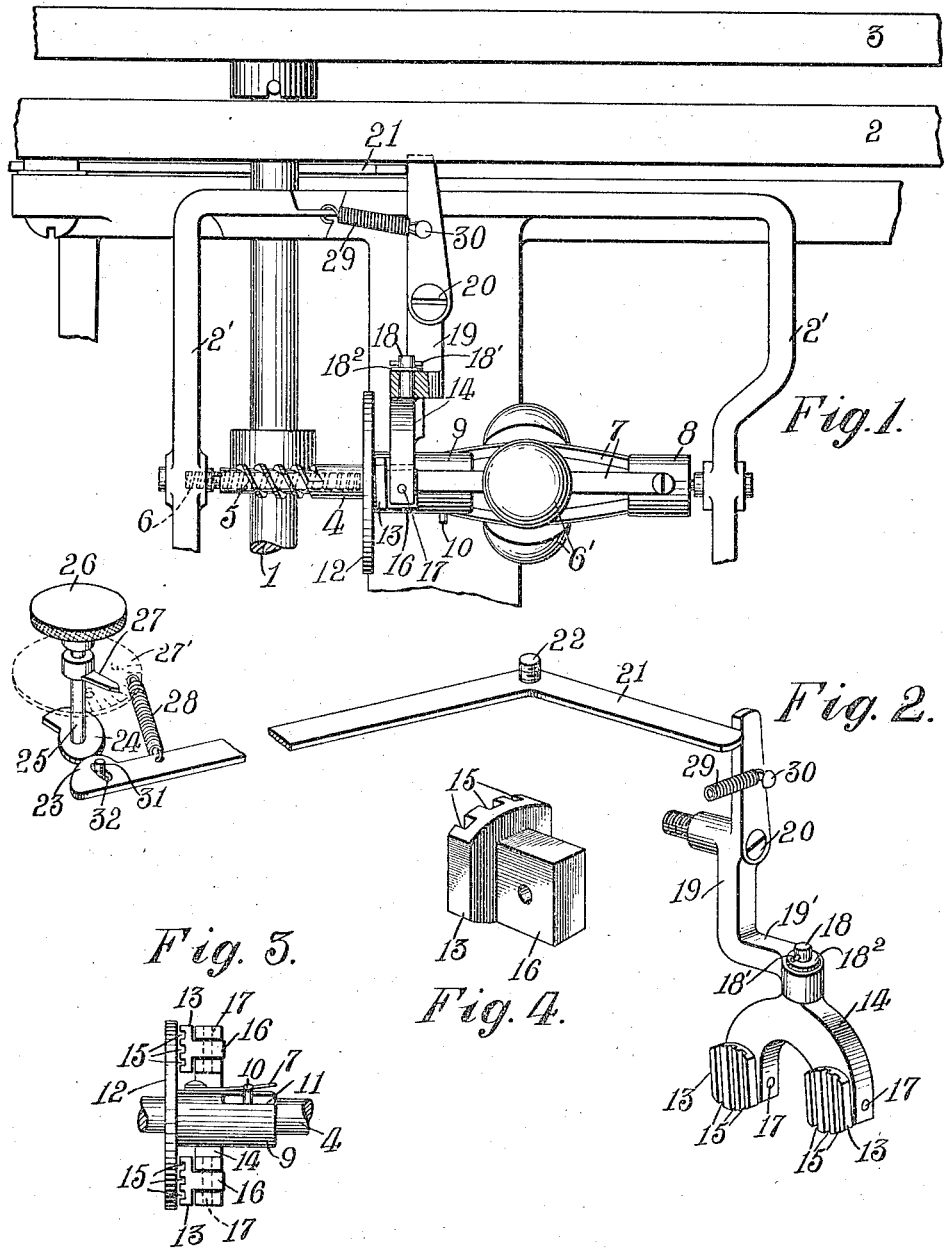
WITNESSES
INVENTOR
Thomas A. Edison
BY Dyer & Holden
ATTORNEYS

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

FRICTION SPEED-GOVERNOR.

1,290,138. Specification of Letters Patent. Patented Jan. 7, 1919.

Application filed December 2, 1913. Serial No. 804,172.

*To all whom it may concern:*

Be it known that I, THOMAS A. EDISON, a citizen of the United States, and a resident of Llewellyn Park, West Orange, Essex county, New Jersey, have invented a certain new and useful Improvement in Friction Speed-Governors, of which the following is a description.

My invention relates to friction speed governors and has for its principal object the provision of a governor which, when once adjusted to the desired speed, will maintain said speed for a long time without the necessity for readjustment.

I have found that brake shoes of felt and similar material commonly employed with friction speed governors become worn and deformed by the rotating friction surface against which they bear and that the speed of the governor accordingly has a tendency to increase. To prevent an objectionable increase of speed with such governors, it is accordingly necessary to frequently readjust the position of the brake shoe with respect to the rotatable friction surface. In carrying my invention into effect, I eliminate this objection by forming the governor brake shoes of a hard wear-resisting material, an ivory-like material, such as natural or artificial ivory, bone, or celluloid being preferred. In order to prevent objectionable wear of the friction shoes on the rotatable friction element, I preferably form the latter of a very hard material such as glass hardened steel.

Another object of my invention is to wholly overcome irregularities in speed due to uneven engagement of the coacting friction surfaces of the brake shoes and the rotatable friction element. In accordance with this object, I support the brake shoes in such a manner that they are free to move into complete and uniform engagement with the rotatable friction surface. As to this feature, my invention is an improvement upon that disclosed in my U. S. Patent No. 604,740, dated May 31, 1898 and entitled Governor for Motors. In the device disclosed in the said patent, I employ two friction brake shoes supported by an equalizing device swiveled for free and unrestrained movement in a given direction whereby it may readily adjust itself in the said direction to cause the brake shoes to press with comparatively equal force against the rotatable friction surface. In the present invention, the adjustability of the friction shoes with respect to the rotatable friction surface is increased by mounting the said shoes for additional free and unrestrained movement, preferably in a direction substantially at right angles to the direction of movement of the equalizing device. With the improved construction thus obtained, a very uniform and complete engagement is obtained between the brake shoes and the rotatable friction surface.

Other objects of my invention will appear more fully in the following specification and appended claims.

In order that my invention may be more clearly understood, attention is hereby directed to the accompanying drawing forming a part of this specification and in which—

Figure 1 is a side elevation partly in section showing my improved governor applied to a phonograph or talking machine;

Fig. 2 is a perspective view showing my preferred means for regulating the position of the brake shoes with respect to the rotatable friction element;

Fig. 3 is a bottom plan view showing a detail of construction; and

Fig. 4 is a perspective view showing one of my improved brake shoes.

In all the views, like parts are designated by the same reference numerals.

Referring to the drawing, the numeral 1 designates a vertical spindle driven by any suitable means (not shown), the upper end of the spindle extending through the top plate 2 of the phonograph motor cabinet and carrying the turntable 3 upon the which the sound records to be reproduced are supported. The horizontal governor shaft 4 is supported, as shown, in spaced arms in the motor frame 2' and is provided with a worm 5 meshing with a worm wheel 6 on the spindle 1, whereby rotation is imparted from the spindle 1 to the shaft 4. The speed governor is formed with weights 6' carried by springs 7 which are attached at one end to a hub 8 formed or secured upon one end of the shaft 4, the springs 7 being attached at the opposite end to the sliding sleeve 9 which is movable longitudinally on the shaft 4. A pin 10 secured to the shaft 4 is located in a longitudinal slot 11 formed in the sleeve 9 and serves to prevent relative rotation between the said sleeve and shaft. The sleeve 9 carries the friction disk 12, which, as heretofore stated, is preferably formed of glass hardened steel and is provided with a ground and highly polished friction surface normally in engagement with the friction brake shoes 13. These shoes, as heretofore stated, are preferably formed of ivory or the like, and they are so arranged and supported by the equalizing device 14 that they engage the friction disk 12 at diametrically opposite points. The coacting friction surfaces of the disk 12 and the brake shoes 13 are preferably lubricated, although this is not absolutely necessary, vertical grooves 15 being formed in the friction surfaces of the brake shoes to receive any excess of lubricant. The brake shoes, as shown, are provided with rearwardly extending portions 16 of reduced cross section arranged in slots in the lower portion of the equalizing device 14, horizontal pivots 17 extending through the parts 16 and the lower portion of the equalizing device 14 to support the brake shoes for free and unrestrained up and down movement with respect to the equalizing device. The said device, as shown, is in the form of a yoke or fork which carries at its upper end a pin 18 whereby the device is pivoted in the lower end of lever 19 for movement about a substantially vertical axis lying in the same plane as the axis of pivots 17. To prevent displacement of the member 14 downwardly from the lever 19, the pivot pin 18 is provided with a laterally extending pin or projection 18' bearing upon a washer 18² which rests upon the upper surface of a horizontal offset 19' on the lower end of the lever 19. The axes of the pivots 17 and 18 pass substantially through the axis of rotation of the disk 12. It will readily be seen that by reason of the free and unrestrained movement of the device 14 about the vertical pivot 18 and the free and unrestrained movement of the brake shoes about the horizontal pivots 17, the said shoes are free to adjust themselves into uniform engagement with the friction disk 12. The uniform pressure of the brake shoes upon diametrically opposite points of the disk 12 also tends to overcome irregularities in speed due to uneven action of the governor weights and to the cramping of sleeve 9 upon spindle 4.

Lever 19 is supported by horizontal pivot screw 20 secured in the motor frame and is engaged at its upper end by one arm of a horizontal bell crank lever 21 pivotally supported, as by means of vertical pivot screw 22, secured to the top plate 2. The end of lever 21 opposite that bearing against the lever 19 is provided with a curved enlargement 23 against which bears a cam 24 secured to the lower end of a vertical spindle 25. The upper end of the spindle carries a thumb nut 26 whereby the spindle and the cam 24 may be readily rotated to cause movement of levers 21 and 19 to adjust the brake shoes 13 nearer to or farther away from the friction disk 12. An index finger 27 is secured to spindle 25 to indicate in connection with any suitable scale 27' the speed for which the governor has been adjusted. A spring 28 secured at one end to lever 21 and at the opposite end to any suitable stationary member serves to hold the lever 21 in engagement with the cam 24, and a second spring 29 secured at one end to stud 30 projecting from lever 19 and at the other end to the motor frame serves to hold the lever 19 in engagement with the lever 21. A vertical screw 31 secured to the top plate 2 engages in a slot 32 in lever 21 to limit the amount of rotation of said lever about the pivot 22. It will be seen that by rotating the knurled thumb piece 26 in one direction the brake shoes will be brought closer to the friction disk 12 to thereby reduce the speed of the governor, and that by rotating said thumb piece in the opposite direction, the brake shoes will be moved away from the friction disk to thereby permit the speed of the governor to increase.

I do not limit myself to the exact details herein shown and described, but what I claim as new and desire to protect by Letters Patent of the United States is as follows:

1. In a friction speed governor, the combination with a rotatable disk shaped element having a flat friction surface, of a friction brake shoe of ivory-like material bearing on said friction surface, substantially as described.

2. In a friction speed governor, the combination of a rotatable element having a flat friction surface and a friction element bearing against said friction surface, one of said elements being formed of hardened steel and the other of ivory-like material, substantially as described.

3. In a friction speed governor, the combination with a rotatable element having a friction surface, of a friction brake shoe of wear-resisting material having a grooved surface bearing against said friction surface, substantially as described.

4. In a friction speed governor, the combination of a rotatable element having a friction surface, a pivoted friction brake shoes bearing on said friction surface at opposite points, and an equalizing device pivoted for movement about an axis at an angle to the pivotal axes of said brake shoes for maintaining the same pressure between both brake shoes and said friction surface, the pivotal axes of said brake shoes and equalizing device passing substantially through the axis of rotation of said rotatable element, substantially as described.

5. In a friction speed governor, the combination of a rotatable element having a friction surface, a support pivoted for free and unrestrained movement about a given axis, and a friction brake shoe bearing against said friction surface and pivoted to said support for free and unrestrained movement about an axis at right angles to said first named axis, said axes passing substantially through the axis of rotation of said rotatable element, substantially as described.

6. In a friction speed governor, the combination of a rotatable element having a friction surface, two friction brake shoes bearing on said surface at opposite points, and an equalizing device movable horizontally for maintaining the same uniform pressure between both brake shoes and said friction surface, said brake shoes being supported for movement relatively to said equalizing device in a direction substantially at right angles to the direction of movement of said equalizing device, substantially as described.

7. In a friction speed governor, the combination of a rotatable element having a friction surface, friction brake shoes bearing on said friction surface at opposite points, and an equalizing device for maintaining a uniform pressure between said brake shoes and said friction surface, said equalizing device supporting said brake shoes for independent pivotal movement and being capable of swinging about an axis substantially at right angles to the pivotal axes of the brake shoes, substantially as described.

8. In a friction speed governor, the combination of a rotatable element having a friction surface, pivoted friction brake shoes bearing on said friction surface at opposite points, and an equalizing device pivoted for movement about an axis at an angle to the pivotal axis of said brake shoes for maintaining the same pressure between both brake shoes and said friction surface, the pivotal axes of said brake shoes and equalizing device lying in substantially the same plane and passing substantially through the the axis of rotation of said rotatable element, substantially as described.

9. In a friction speed governor, the combination of a rotatable element having a friction surface, a friction element movable into engagement with said surface, a pivoted lever for controlling said friction element, a cam rotatable about an axis parallel with the axis of the lever, engaging said lever for moving the same and provided with an actuating thumb nut and a spring for holding said lever in engagement or contact with the cam, substantially as described.

10. In a friction speed governor, the combination of a rotatable element having a friction surface, a support pivoted for free and unrestrained movement about a given axis and a friction brake shoe adapted to bear on said friction surface and pivoted to said support for free and unrestrained movement relatively to said support about an axis substantially at right angles to the said axis of the support, substantially as described.

11. In a friction speed governor, the combination of a rotatable element having a friction surface, a pivoted lever adjacent thereto and a brake shoe supported by said lever, adapted to bear on said friction surface and movable on the lever about axes substantially at right angles to each other, one of said axes being substantially parallel with the axis of said lever whereby when said lever is actuated the brake shoe will adjust itself into uniform engagement with the friction surface, substantially as described.

12. In a friction speed governor, the combination of a rotatable element having a friction surface, a pivoted lever adjacent thereto, an equalizing device pivoted to said lever upon an axis substantially at right angles to the axis of the lever and a pair of brake shoes adapted to bear on said friction surface and pivoted to said equalizing device upon axes substantially at right angles to the axis of the equalizing device whereby when said lever is actuated the brake shoes will adjust themselves into uniform engagement with the friction surface, substantially as described.

This specification signed and witnessed this 21st day of November, 1913.

THOS. A. EDISON.

Witnesses:
FREDERICK BACHMANN,
MARY J. LAIDLAW.

Copies of this patent may be obtained for five cents each, by addressing the "Commissioner of Patents, Washington, D. C."